May 21, 1957 C. D. WEST 2,793,148
OPTICAL PRODUCTS
Filed March 17, 1953

INVENTOR.
Cutler D. West
BY
Brown and Mikulka
and
Gerald Altman
ATTORNEYS

United States Patent Office 2,793,148
Patented May 21, 1957

---

2,793,148

OPTICAL PRODUCTS

Cutler D. West, Cambridge, Mass., assignor to Polaroid Corporation, Cambridge, Mass., a corporation of Delaware Application March 17, 1953, Serial No. 342,812

3 Claims. (Cl. 154—2.65)

This invention relates to optical products in which optical surfaces are joined by a cement and to processes of their manufacture.

Objects of the invention are: to provide a variety of optical products in which optical surfaces are joined by a cement containing succinonitrile as its characteristic ingredient; and to provide processes of manufacturing optical products of the foregoing type.

Other objects of the invention will in part be obvious and will in part appear hereinafter.

The invention accordingly comprises several steps and the relation and order of one or more of such steps with respect to each of the others, and the product possessing the features, properties and the relation of elements which are exemplified in the following detailed disclosure, and the scope of the application of which will be indicated in the claims.

Figure 1:
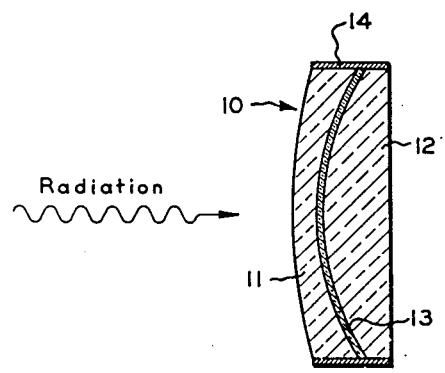
Figure 2:
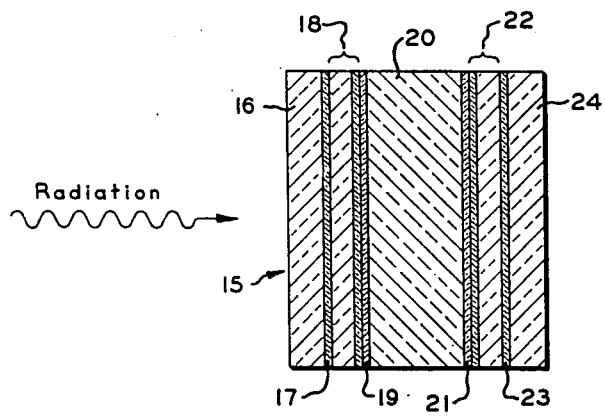

For a fuller understanding of the nature and objects of the invention, reference should be had to the following detailed description taken in connection with the accompanying drawing wherein:

Figure 1 is a schematic cross-sectional view of an achromatic doublet embodying the invention; and Fig. 2 is a schematic cross-sectional view of an electro-optical light valve embodying the present invention.

Products embodying the present invention provide at least two optical surfaces that are joined by a cement which, because it contains succinonitrile as its characteristic or predominant ingredient, possesses the following physical, chemical and optical properties: optical clarity; refractive index ($N_D^{20}$=1.45) of the same order of magnitude as that of optically useful glass and plastics; isotropy within the temperature range of from $-40°$ to $57.2°$ C; low volatility; strong cohesive forces; strong adhesive forces relative to optically useful glass and plastic materials; and chemical stability. The unique properties of succinonitrile are believed to be the consequence of its rare molecular structure characterized by a molecule which is small in size, which possesses a plurality of strong dipoles in motion with respect to each other, and which is rotatable about its center.

Specifically, the aforementioned cement is composed of one of the following: (1) substantially pure succinonitrile; (2) commercial succinonitrile (containing a small quantity of water); and (3) a mixture containing from 95 to 99-plus percent by total weight of succinonitrile and from a trace to 5 percent of at least one other material upon which the properties of the mixture (i. e., temperature range of stability, refractive index, dielectric constant, etc.) partially depend.

The following is a list of the properties of pure and commercial succinonitrile:

TABLE I

|  | Melting Point, °C. | Boiling Point, °C. | Molecular Weight | Density | Molar Volume |
|---|---|---|---|---|---|
| Succinonitrile (Pure and commercial). NCCH₂CH₂CN | 55 | 267 | 80.05 | 1.050 | 76.3 |

The following is a list of the properties of other compounds with at least one of which succinonitrile may be advantageously mixed.

TABLE II

|  | Melting Point, °C. | Boiling Point, °C. | Molecular Weight | Density | Molar Volume |
|---|---|---|---|---|---|
| Dicyan acetylene NCC≡CCN | 21 | 76.5 | 76.05 | 0.970 | 78.4 |
| Succinic acid HOOCCH₂CH₂COOH | 185 | 235 | 118.05 | 1.564 | 75.5 |
| Ethylene chloride ClCH₂CH₂Cl | −35 | 84 | 98.95 | 1.257 | 78.8 |
| Ethylene bromide BrCH₂CH₂Br | 10 | 132 | 187.86 | 2.170 | 85.5 |
| Methylene iodide CH₂I₂ | 5 | 180 | 267.86 | 3.325 | 80.5 |
| Methyl glycolate CH₂OHCOOCH₃ | -------- | 151 | 90.05 | 1.168 | 77.2 |
| Glycerol CH₂OHCHOHCH₂OH | 18 | 290 | 92.06 | 1.260 | 73.0 |
| Trimethylene glycol HO(CH₂)₃OH | -------- | 214 | 76.06 | 1.053 | 72.2 |
| Propylene glycol CH₂OHCHOHCH₃ | -------- | 189 | 76.06 | 1.040 | 73.1 |
| Ethylene glycol monomethyl ether CH₂OCH₂CH₂OH | -------- | 124 | 76.06 | 0.966 | 79.4 |
| Propionic acid CH₃CH₂COOH | -------- | 141 | 74.05 | 0.992 | 75.0 |

TABLE II.—Continued

| | Melting Point, °C. | Boiling Point, °C. | Molecular Weight | Density | Molar Volume |
|---|---|---|---|---|---|
| Propionitrile CH₃CH₂CN | ------- | 97 | 55.05 | 0.783 | 70.4 |
| n-Butyronitrile CH₃(CH₂)₂CN | ------- | 118 | 69.08 | 0.796 | 86.6 |
| Butyrolactone —(CH₂)₃COO— | ------- | 206 | 86.05 | 1.129 | 76.4 |
| 1,4-dioxane —(CH₂)₂O(CH₂)₂O— (dipole free) | 12 | 101 | 88.06 | 1.035 | 85.1 |
| Benzene C₆H₆ (dipole free) | 5 | 80 | 78.05 | 0.884 | 88.3 |

The value for a given property of a mixture of succinonitrile and one of the foregoing compounds lies between the value for that property of succinonitrile and the value for that property of the compound with which the succinonitrile is mixed.

Two methods of fabricating products embodying the present invention are preferred. The first, a casting process, comprises the steps of predeterminedly positioning a pair of optical surfaces with respect to each other, pouring between them a liquid cement of the foregoing type, and permitting the liquid cement to freeze. The second, an extruding process, comprises the steps of locating between a pair of optical surfaces a solid cement of the foregoing type and pressing the surfaces toward each other into predetermined relative positions.

With reference now to the drawing, Fig. 1 shows an achromatic doublet 10 embodying the invention. Achromatic doublet 10 comprises a pair of thin lenses 11 and 12, the adjacent optical surfaces of which are contiguous. Lens 11 is composed of a first, optically useful material such as flint glass and lens 12 is composed of a second, optically useful material such as crown glass. Joining the adjacent surfaces of the lens is a thin layer 13 of a cement which contains succinonitrile as its characteristic ingredient. An edge seal 14 composed of a suitable metal is provided to prevent the cement in layer 13 from evaporating.

It is well known that of the total light flux incident upon the interface between two different materials, the percentage reflected rather than refracted is a direct function of the difference between the indices of refraction of the two materials. Although the difference between the indices of refraction of lenses of the type ordinarily used in an achromatic doublet is not significant in this respect, the differences between the indices of refraction of the thin layer of air between the adjacent surfaces of these lenses and the lenses themselves ordinarily is appreciable. Such a layer of air, therefore, often is responsible for the reflection of an appreciable proportion of incident light. In the case of achromatic doublet 10, however, since the index of refraction of layer 13 is of the same order of magnitude as the indices of refraction of lenses 11 and 12, layer 13, in addition to joining the lenses, substantially eliminates reflection at the joined surfaces.

The embodiment of the present invention shown in Fig. 2 is an electro-optical light valve, generally designated by 15, which comprises a pair of crossed polarizing elements and therebetween a crystal which, in conventional fashion, when subjected to an electrostatic field, introduces a phase difference between linear components of incident polarized light. Light valve 15 specifically comprises, in continuous sequence, a first polarizing filter 16, a layer 17 of cement, a transparent electrical conductor 18, a layer 19 of cement, a crystal 20 which, when subjected to an electrostatic field, introduces a phase difference between linear components of incident polarized light, a layer 21 of cement, a transparent electrical conductor 22, a layer 23 of cement and a second polarizing filter 24 crossed with respect to first polarizing filter 16. In one form, light valve 15 comprises a crystal composed of cuprous halide, transparent electrical conductors 18 and 22, composed of glass having Nesa coatings which are adjacent to crystal 20, layers 17, 19, 21 and 23 composed of a cement which contains succinonitrile as its characteristic ingredient, and polarizing filters 16 and 24 of a conventional type.

In operation, assuming that polarizing filters 16 and 24 are linear, in the absence of an electrostatic field applied to crystal 20, light valve 15 acts as a closed shutter to incident light. However, when an electrostatic force is applied to crystal 20, a phase difference between linear components of light transmitted by polarizing filter 16 is introduced so that at least a proportion of this light can pass through polarizing filter 24. It is apparent that the proportion of incident light transmitted by light valve 15 is dependent on the intensity of the electrostatic field applied to the crystal 20 and that this electrostatic field may be varied in order to vary the proportion of light transmitted. Here, layers 17, 19, 21 and 23 substantially eliminate reflection at the surfaces which they join. Furthermore, layers 19 and 21 are desirable, from an electrical standpoint, in that, because they possess a lower conductivity than does crystal 20, they do not appreciably disrupt an electrical field to which the crystal is being subjected.

It is to be understood that lenses of various shapes can be joined by cements embodying the present invention. Where the joined surfaces have different curvatures, the cement acts both as an adhesive and as a plastic lens.

Since certain changes may be made in the above product and process without departing from the scope of the invention herein involved, it is intended that all matter contained in the above description or shown in the accompanying drawing shall be interpreted as illustrative and not in a limiting sense.

What is claimed is:

1. A laminated product comprising, in sequence, a first layer composed of glass, a second layer composed of an adhesive material containing succinonitrile as its predominant ingredient, and a third layer composed of glass.

2. A laminated product comprising, in sequence, a first layer composed of glass, a second layer composed of an adhesive material containing at least about 95% succinonitrile, and a third layer composed of glass.

3. A laminated product comprising, in sequence, a first layer composed of glass, a second layer composed of an adhesive material containing succinonitrile as its predominant ingredient, a third layer composed of glass, and means sealing the edges of said laminated product.

References Cited in the file of this patent

UNITED STATES PATENTS

| | | |
|---|---|---|
| 2,304,754 | Wainer | Dec. 8, 1942 |
| 2,382,660 | Penberthy | Aug. 14, 1945 |
| 2,434,606 | Carpenter | Jan. 13, 1948 |
| 2,453,665 | Kropa | Nov. 9, 1948 |
| 2,493,200 | Land | Jan. 3, 1950 |
| 2,494,054 | Nadeau et al. | Jan. 10, 1950 |
| 2,543,793 | Marks | Mar. 6, 1951 |
| 2,649,027 | Mason | Aug. 18, 1953 |